(12) United States Patent
Tartaglia et al.

(10) Patent No.: US 8,189,003 B2
(45) Date of Patent: May 29, 2012

(54) SYSTEM AND METHOD FOR RENDERING COMPUTER GRAPHICS UTILIZING A SHADOW ILLUMINATOR

(75) Inventors: Bruce Nunzio Tartaglia, Santa Monica, CA (US); Philippe Denis, San Francisco, CA (US)

(73) Assignee: Dreamworks Animation LLC, Glendale, CA (US)

( * ) Notice: Subject to any disclaimer, the term of this patent is extended or adjusted under 35 U.S.C. 154(b) by 1127 days.

(21) Appl. No.: 11/801,163

(22) Filed: May 8, 2007

(65) Prior Publication Data

US 2008/0278491 A1    Nov. 13, 2008

(51) Int. Cl.
*G06T 15/50* (2011.01)
(52) U.S. Cl. ........ 345/426; 345/421; 345/422; 345/424; 345/427
(58) Field of Classification Search .................. 345/421, 345/422, 424, 426, 581, 582, 589, 629, 427; 362/1, 3, 20, 21, 600, 601, 84
See application file for complete search history.

(56) References Cited

U.S. PATENT DOCUMENTS

| 6,760,024 B1* | 7/2004 | Lokovic et al. ............... 345/421 |
| 2003/0053689 A1* | 3/2003 | Watanabe et al. ............ 382/167 |
| 2004/0102247 A1* | 5/2004 | Smoot et al. .................... 463/36 |
| 2005/0206890 A1* | 9/2005 | Hurst et al. ................ 356/239.7 |
| 2006/0114477 A1* | 6/2006 | Cox et al. ....................... 356/602 |
| 2008/0136947 A1* | 6/2008 | Baer ............................. 348/294 |
| 2008/0231835 A1* | 9/2008 | Iizuka ............................. 356/72 |
| 2009/0303497 A1* | 12/2009 | Hamalainen ................. 356/635 |
| 2010/0110165 A1* | 5/2010 | Iizuka ............................. 348/50 |
| 2010/0149315 A1* | 6/2010 | Qu et al. ......................... 348/46 |

* cited by examiner

*Primary Examiner* — Jeffery A Brier
*Assistant Examiner* — Abderrahim Merouan
(74) *Attorney, Agent, or Firm* — Morrison & Foerster LLP

(57) ABSTRACT

Embodiments of the present invention are directed to rendering computer graphics using an augmented direct light model which approximates the effect of indirect light in shadows. More specifically, a shadow illuminator light source is provided for. The shadow illuminator light source is associated with an ordinary, or primary light source and is used to provide illumination in areas which are in shadows with respect to the primary light source. The shadow illuminator provides illumination only to areas which are considered to be in the shadows with respect to the light source the shadow illuminator is associated with. Thus, the shadow illuminator may be used to approximate the effects of indirect light.

37 Claims, 9 Drawing Sheets

SYSTEM AND METHOD FOR RENDERING COMPUTER GRAPHICS UTILIZING A SHADOW ILLUMINATOR

FIELD OF THE INVENTION

This invention relates to computer graphics, and more particularly to rendering computer graphics by using a shadow illuminator.

BACKGROUND OF THE INVENTION

Computer graphics are used in various fields, such as animation, computer games, etc. An important goal of computer graphics is the ability to generate virtual images that are realistic, i.e. similar to naturally occurring images. A major impediment to reaching this goal is the inherent computational limitations of existing computer systems.

More specifically, lighting continues to pose challenges in the field of computer graphics. Naturally, light is an important factor in how one perceives an image. An observer (e.g., a human eye or a camera) perceives an object by detecting light reflected from that object (in other cases the light may be passing through the object or be refracted by the object instead). The light detected from an object may be classified in two types. Direct light is light that travels directly from a light source to the object and to the observer. Indirect light is light that does not travel directly from a light source to the object. For example, indirect light may be light that is reflected from another object before it reaches the object being observed. Alternatively, indirect light may be light that goes through a translucent object before reaching the object being observed.

In the real world, much of the light that we use to perceive the world around us is indirect light. Thus, we can usually see objects that are not directly exposed to a particular light source. For example, in a bright day, a room with a window is usually well-illuminated even if the sun does not directly shine through the window, because the sun's rays reflect from the surrounding scenery and pass through the window, thus illuminating the room.

Considering the above, a perfect computer graphics system would be able to track indirect light to ensure realistic illumination of objects. Unfortunately, for most situations, such a system would be impractical as it would require a very large amount of computing resources. In order to account of indirect light, one has to trace each light ray (or electron) from a light source and off of all objects from which it reflects (this is sometimes referred to as ray tracing). Considering the incredibly large number of light rays illuminating a scene, and the complex paths each light ray may take when being reflected of various objects in a scene, this is not practical.

For the above reasons, many current computer graphics systems are direct light systems. In other words, they usually only take into account light going directly from a light source to an observed object when calculating how that object should be displayed. While using a direct light system significantly reduces computational costs, these systems may, in certain situations, create images that are very unrealistic.

For example, in a direct light system, an object is either directly illuminated by a light or it is not illuminated by that light at all. Thus, for example, if there is only one light source in a scene and a first object is in the shadow of a second object, the first object will usually receive no light in a direct illumination computer graphics scheme. Therefore, the first object will be rendered as being completely dark. This, however, is usually not realistic. In the real world, objects in shadows usually receive some indirect light. Therefore, in the real world, shadows are usually soft. In other words, while shadows receive a lesser amount of light than directly illuminated spaces, they nevertheless do receive some light. Consequently, computer generated images following direct illumination schemes often look unrealistic because they have very stark and harsh shadows.

There have been several attempts to solve the above problem. One is to manually change the color of objects in the shadows to make shadows look softer. This solution is not considered desirable as it requires significant amount of human intervention and thus negates one of the intended benefits of computer graphics—the ability to partially or completely automate the generation of images. Requiring an artist to manually adjust the shadows of computer generated graphics can be very expensive and is often impractical.

Another attempt to solve the above problem is to define additional light sources to illuminate shadowed regions. These additional light sources are usually not associated with an actual light emitting object that is visible in the scene (such as a lamp). Instead, they are intended to approximate the effects of indirect light. This method suffers from the fact that the additional light sources may also illuminate non-shadowed regions, thus decreasing the realism of some parts of the image in order to improve the realism of the shadowed portions.

Another scheme is to use techniques similar to anti-aliasing in order to "smooth over" the edges of shadows. Thus, for example, when determining whether a given pixel is lit, the illumination received by the given pixel may be averaged with illumination levels of a number of pixels in proximity to the given pixel. This would result in more gradual or smooth changes of illumination levels. While this scheme does provide some minor improvement, it does not solve the problem discussed above as the problem is not limited to the edges of shadows. In other words, in direct lighting schemes, the entire shadow, not its edges only, receives unrealistically low illumination. Therefore, even if this technique is used, the non-edge regions of shadows will still be unrealistically dark.

What is needed is a system and method for shading shadowed regions in a computer graphics generated scene that approximates the indirect light effect on shadows in the context of a direct illumination model.

SUMMARY OF THE INVENTION

Embodiments of the present invention are directed to rendering computer graphics using an augmented direct light model which approximates the effect of indirect light in shadows. More specifically, a shadow illuminator light source is provided for. The shadow illuminator light source is associated with an ordinary, or primary light source and is used to provide illumination in areas which are in shadows with respect to the primary light source. The shadow illuminator provides illumination only to areas which are considered to be in the shadows with respect to the light source the shadow illuminator is associated with. Thus, the shadow illuminator may be used to approximate the effects of indirect light.

In some embodiments a single shadow illuminator may be associated with multiple primary light sources. Similarly, in some embodiments, multiple shadow illuminators may be associated with a single light source. Furthermore, in some embodiments, nested shadow illuminators may be used. Nested shadow illuminators are shadow illuminators that may be associated with other shadow illuminators.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
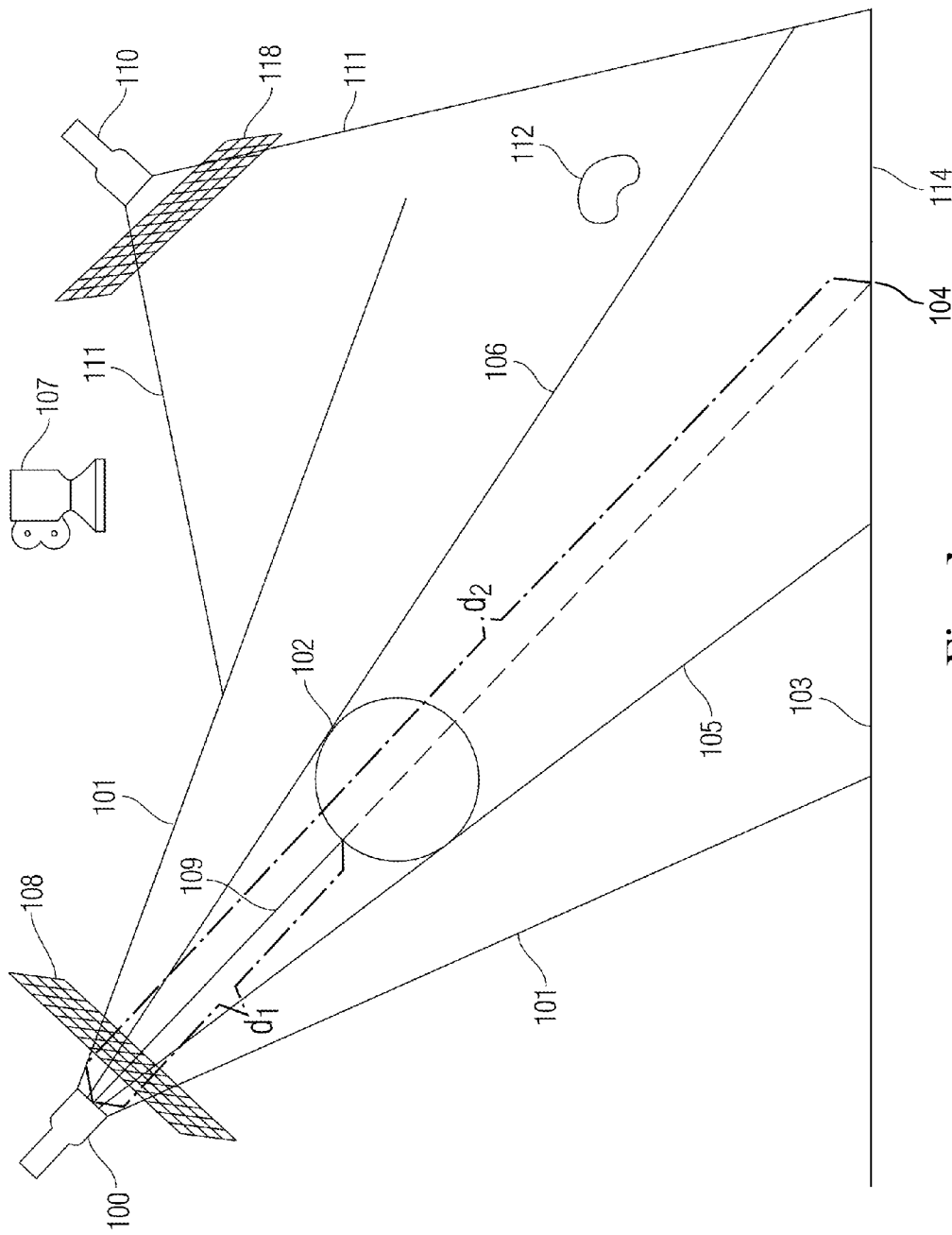
FIG. 1 is an illustration of an exemplary scene featuring a primary light source and a shadow illuminator.

FIG. 1 illustrates a direct illumination scheme for rendering computer generated graphics. FIG. 1 shows various elements which are represented as belonging to a virtual scene. The scene is a plurality of objects which are used for the purposes of creating or rendering images or video. The objects of a scene may be objects that are intended to be visible in the rendered images, or other objects, such as light sources or cameras that need not be visible but may still affect the rendered image. The objects defining a scene are usually generated by a computer and stored in a computer memory. Thus, a scene may be defined by various digital definitions of objects belonging to it, as well as data defining the various special relationships between the objects.

A light source 100 is placed in a scene. Light source 100 is of the spotlight type. In other words, it provides light rays that originate at a point but only extend to a limited radial range. Spotlight types of lights are known in computer graphics. Other known types of lights are point lights which provide light originating at a point and extending in all directions, and directional lights which provide parallel rays of light. While the present invention is discussed in the context of spotlights, it is applicable to other types of lights as well.

In a computer graphics model, light 100 may be defined by its position and the cone 101 within which it emits light. An object 102 is also placed within the scene. The object 102 is a sphere but it may be any other object. The scene also includes a floor 103.

The object 102 may create a shadow on the floor by blocking out part of the light emitted from light source 100. The boundary of shadow is defined by light rays 105 and 106 as shown. Camera 107 defines the desired point of view. In other words, camera 107 is the point of view from which a computer generated image is to be created.

In a direct illumination model, usually only objects or portions thereof which are directly illuminated by light 100 are lit. Therefore, in a direct illumination model, shadowed portion of the floor 103 would not be lit. A known way to determine which portions of objects should be lit and which are in shadows for a direct illumination model is through the use of depth maps.

A depth map (also referred to as a shadow map) is an array of data associated with a particular light source (such as light source 100). The depth map holds the distance between each ray of light emitted by the light source and the closest object blocking that ray of light. In this particular model, a "ray of light" is an abstraction used for computational purposes. It signifies a line in space through which light travels, and need not be associated with a single photon. The number of rays of light emitted by a single light source may vary and depend on the desired resolution of the scene. However, this number is usually much smaller than the number of actual photons emitted by a real source of light.

The depth map is shown in FIG. 1 as array 108. It may include an entry for each ray of light emitted from the light source 100. For example, the entry associated with ray 109 may hold the value $d_1$ indicating the distance between the light source and the portion of object 102 which blocks that ray.

When rendering the scene for camera 107, the system may first examine all objects that are visible to the camera. It may then tessellate and rasterize these objects according to methods known in the art. After the tessellation and rasterizing steps, the system has a plurality of pixels which compose the visible scene. The next step is to shade the pixels or, in other words, determine the color and brightness of the pixels.

In order to determine the color and brightness, the system must first determine how much and what type of light each pixel receives. Existing direct illumination systems accomplish this by determining whether the pixel is being illuminated or is in a shadow with regard to each light source in the scene. After that, the amount of light received from each light source is added. The light contributed from various light sources may also be modified to account for the angle between the incident light rays and the surface of the pixel, because light which is incident at oblique angles to the surface is usually reflected less brightly than light incident at perpendicular or near perpendicular angles to the surface. The angle of light is usually accounted for by taking a dot product of a vector representing the direction and magnitude of incident light with a unit length vector normal to the surface of the pixel. Colors of the light emitted by various light sources may also be taken into account when aggregating the light sources illuminating a pixel.

Thus aggregated, the light illuminating a pixel is used in conjunction with the color and texture of the surface associated with the pixel to determine the color and brightness of the pixel to be shaded or rendered.

However, in order to execute the above discussed procedure, one must determine whether a pixel is illuminated by each light source in the scene or not. First, it is determined whether the pixel in question is in the general illuminated space of a light source (e.g., the cone 101 of light source 100). If the pixel is within the cone, it is then determined whether the pixel is within a shadow of any objects as it relates to that light source. To determine that, the shadow map associated with the light source is used. For example, if pixel 104 is being examined with respect to light source 100, then shadow map 108 will be used. The distance between the pixel and the light source is obtained and compared with the distance between the light source and the closest object to the light source in the direction of the pixel as stored in the shadow map 108.

For example, if pixel 104 is being examined for illumination from light source 100, the distance between the pixel and the light source $d_2$ is compared with the distance between the light source and the nearest object $d_1$ ($d_1$ having been obtained from shadow map 108). If $d_2$ is equal to $d_1$ it means that the pixel being examined is not in the shadows of any objects as relating to light source 100. If, on the other hand, $d_2$ is greater than $d_1$, then the pixel is in a shadow and should receive no light from light source 100. It can be seen in FIG. 1 that, for pixel 104, $d_2 > d_1$. Therefore, pixel 104 is in a shadow relative to light source 100 and should not receive any illumination from that light source. On the other hand, pixel 103 is not in a shadow and therefore should receive illumination from light source 100.

The above discussed process may be performed for each light in a scene, to determine the total illumination a pixel receives.

It should be noted that for the purposes of the present discussion, the state of a pixel being in a shadow is related to a particular light source. Thus, a pixel may be in a shadow resulting from the light of a first light source, but be directly illuminated by a second light source. Even in this case the pixel is considered to be in a shadow with respect to the first light source.

There may be variations of the above discussed process. For example, certain objects, such as object 102, may be ignored when calculating the shadow maps of certain light sources, thus resulting in a system where some objects cast no shadows. Also, in some embodiments, the illumination of a pixel may be determined by not only calculating its own direct illumination, but also calculating the illumination received from a predetermined number of pixels around that pixel and averaging these values. Thus, as discussed above, an anti-aliasing effect may be produced. This effect may be used to soften the edges of shadows.

The above system for determining whether pixels are illuminated by particular light sources has some disadvantages. More particularly, as discussed above, it often creates contrasts between shadowed and lit regions that are too stark. Similarly, it often results in shadowed regions that are too dark. Both of these disadvantages result from the fact that the above discussed method does not take into account the effect of indirect light on the shadows.

Embodiments of the present invention modify the above discussed method to allow for the ability to approximate the effect of indirect light on shadows while generally preserving the efficiencies of the direct light model.

More specifically, according to embodiments of the present invention, one or more existing lights in a scene may be associated with one or more secondary or shadow illuminator lights. For example, in FIG. 1, shadow illuminator 110 may be associated with light source 100. The shadow illuminator is considered a helper light and is used to illuminate the shadows of the primary light it is associated with.

As opposed to the primary light, the shadow illuminator is usually not reflective of any "real life" light source that may be represented in a scene, such as the sun, a flash light, a lamp, etc. Instead the shadow illuminator is an abstraction that is intended to represent indirect light. However, in some situations a shadow illuminator may be considered to represent the illumination associated with an object which may cause a significant amount of indirect light, such as a mirror or a white wall.

The color, intensity, position, illumination area, etc. of the shadow illuminator 110 may be defined by the operator or artist that is designing the scene. The light emitted from the shadow illuminator is calculated for the purposes of shading of pixels in a manner similar to the one discussed above. Thus, the shadow illuminator may, also have a volume 111 within which it emits light, and a shadow map 118 defining the distances between the shadow illuminator and the closest object to it in different directions. However, only pixels that are within the shadows of the primary light source with which the shadow illuminator is associated (e.g. light source 100) are affected by the shadow illuminator. Thus, pixel 103 will not receive any light from shadow illuminator 110, regardless of the fact that it is within the area illuminated by the shadow illuminator and is not in a shadow with respect to the shadow illuminator, because pixel 103 is not in the shadow of the primary light source associated with shadow illuminator 110 (i.e., light source 100). However, pixel 104 is within the shadow of light source 100 and therefore it may receive light from the shadow illuminator 110.

Consequently, the shadow illuminator only illuminates the shadows of the light source it is associated with. Therefore, it can be used by an artist to easily and conveniently approximate the effect of indirect light in shadows, without adversely affecting other un-shadowed areas of the scene.

In some embodiments, the shadow illuminator may also cast shadows. The shadows may be determined by the shadow illuminator's shadow map 118. For example, pixel 114 may be in the shadow with respect to both the primary light source 100 and the shadow illuminator 110. Object 102 casts a shadow over pixel 114 from the primary light source, while object 112 casts a shadow from the shadow illuminator. Thus, in the scene of FIG. 1, pixel 114 should receive no light, unless other light sources are added.

Embodiments of the invention may provide an artist designing a scene with freedom with regard to the design of shadow illuminators. However, to be most effective, shadow illuminators may be designed so that they have less intensity than the primary light they are associated with so that they can correctly simulate indirect light which is usually of lesser intensity than the direct light emitted by the primary light source. Furthermore, effective shadow illuminators may be configured so that they do not share the same shadows as the primary light they are associated with. If a shadow illuminator casts the same shadows as its primary light, then it may have no effect on the scene at all. Thus, it is preferable that the shadow illuminator be displaced from the primary light (as shown in FIG. 1). Alternatively or in addition, the shadow illuminator may be configured so that one or more objects that cast shadows for the primary light source are transparent to the shadow illuminator.

Various embodiments may allow different possible combinations between primary light sources and shadow illuminators. For example, a single shadow illuminator may be associated with multiple light sources. In this case, the single shadow illuminator may illuminate pixels that are in a shadow with respect to any one of the light sources. Alternatively, the single shadow illuminator may only illuminate pixels that are in a shadow with respect to all light sources. Also, multiple shadow illuminators may be associated with a single light source. In this case, multiple shadow illuminators may light the shadows resulting from the single light source.

In addition, nested or recursive shadow illuminators may be used. A nested shadow illuminator is a shadow illuminator that may use another shadow illuminator as its primary light source. Thus, a nested shadow illuminator is associated with another shadow illuminator (the other shadow illuminator may be referred to as the parent). The nested shadow illuminator illuminated only pixels which are in a shadow with respect to the parent shadow illuminator. Multiple levels of nested shadow illuminators are also possible.

Figure 2:
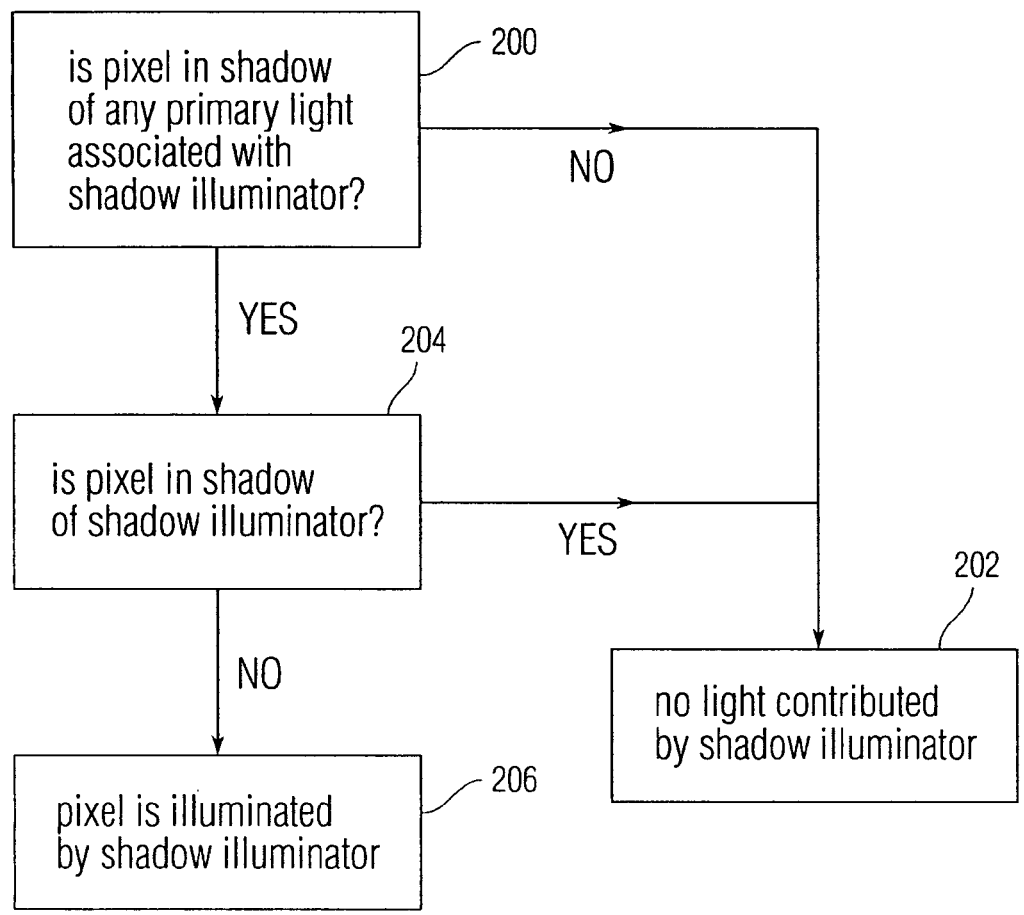
FIG. 2 is a flow chart showing the process of determining the illumination a pixel receives from a shadow illuminator according to an embodiment of the invention.

FIG. 2 is an exemplary method for determining the light which a shadow illuminator contributes to the illumination of a pixel. In step 200, it is determined whether the pixel is within the shadow of the primary light associated with the shadow illuminator. If the shadow illuminator is associated with multiple primary light sources, then step 200 is repeated for each primary light source the shadow illuminator is associated with, and is considered a success if the pixel is in the shadows resulting from any one of the primary lights.

Step 200 may be performed by accessing the shadow map 108 of the primary light source and determining whether the pixel is in a shadow by comparing the distance between the pixel and the primary light with a respective value from the shadow map.

If it is determined that the pixel is not in a shadow of the primary light, then by definition the pixel will receive no light from the shadow illuminator (step 202). However, if the pixel is in a shadow, the process continues to step 204.

In some embodiments, it may be determined that the pixel is in a partial shadow. This may be the case in embodiments that use the anti-aliasing method discussed above to smooth out shadows. If this is the case the process may continue to step 204, but the system may also note that the pixel is in a partial shadow, so that only partial light may be contributed from the shadow illuminator. In other embodiments, the partial shadow case is handled by repeating the process of FIG. 2 for the pixel of interest as well as multiple pixels in the vicinity of said pixel and averaging the results.

Is step 204, it is determined whether the pixel is in any shadow associated with the shadow illuminator itself. Note that this step differs from step 200 as it examines the shadows with respect to the shadow illuminator and not to the primary light sources. Step 204 may be performed by consulting the shadow map of the shadow illuminator 118 and comparing the distance from the shadow illuminator to the pixel against a respective value from the shadow map 118. If the pixel is in a shadow with respect to the shadow illuminator then the pixel may receive no light from the shadow illuminator (step 202) because, according to some embodiments of the invention, the shadow illuminator may create shadows similar to any other light source. See, for example, the discussion above with respect to the shadow created by object 112. If the pixel is not in a shadow associated with the shadow illuminator, the process continues to step 206.

In step 206, it is determined that the pixel is illuminated by the shadow illuminator. The system may then determine the intensity of illumination contributed by the shadow illuminator by taking into account the angle of illumination, the intensity of light emitted by the shadow illuminator, etc. The system may also scale down the intensity of illumination contributed by the shadow illuminator, if it was determined in step 200 that the pixel was in a partial shadow with respect to the primary light.

As discussed above, a process for determining illumination for all light sources, whether shadow illuminators or not, may be performed for the pixel. The light contributed from all light sources may then be summed to determine a total illumination level associated with the pixel, which may in turn be used to shade the pixel.

Figure 3:
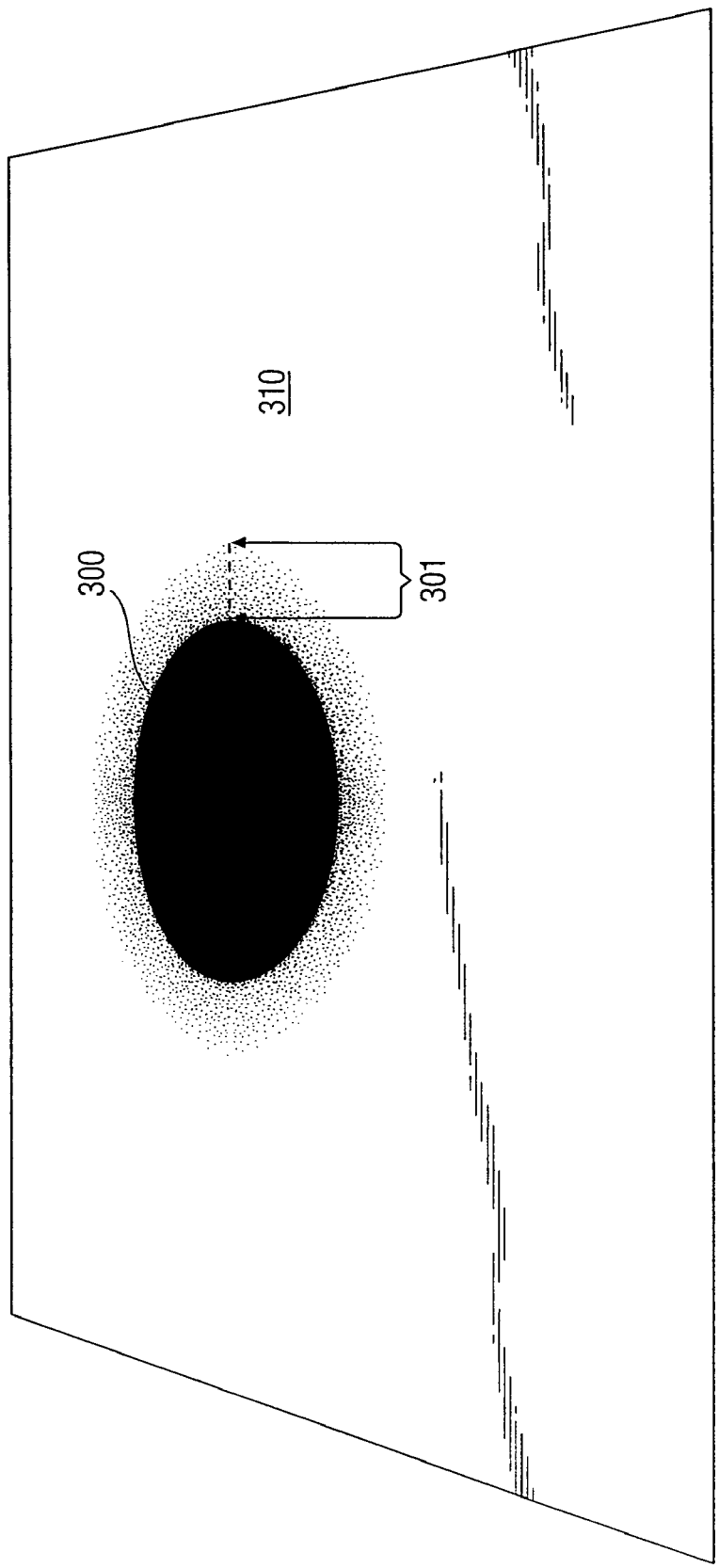
FIG. 3 is a diagram of a rendering of a scene in which no shadow illuminator is used.

FIGS. 3-7 show different versions of a scene resulting from various illumination schemes. FIG. 3 shows a scene rendered using a prior art method in which no shadow illuminator is used. Thus, the scene of FIG. 3 includes a lit region 310 which is illuminated by an over head primary light source (not shown) and a shadow region 300 which has features no illumination whatsoever. Note that the region 301 around the edges of the region 300 is softened, i.e., the anti-aliasing type of process discussed above is used to provide a smooth transition between the lit and shadowed regions. While the transition region 301 is shown by dispersed dots in FIG. 3, this need not be the case. The transition region may be rendered by gradually changing colors ranging from the color of the shadow region 300 (e.g. black) to the color of the lit region 310 (e.g. white). Thus, in the present example, the transition region may include many shades of grey.

Nevertheless, a person of skill in the art would recognize that the scene as rendered in FIG. 3, even after the use of the anti-aliasing process, would not look very realistic. This is the case because the region 300 is too dark—it does not reflect the fact that in most natural scenes, even shadowed regions, are illuminated by some indirect light.

Figure 4:
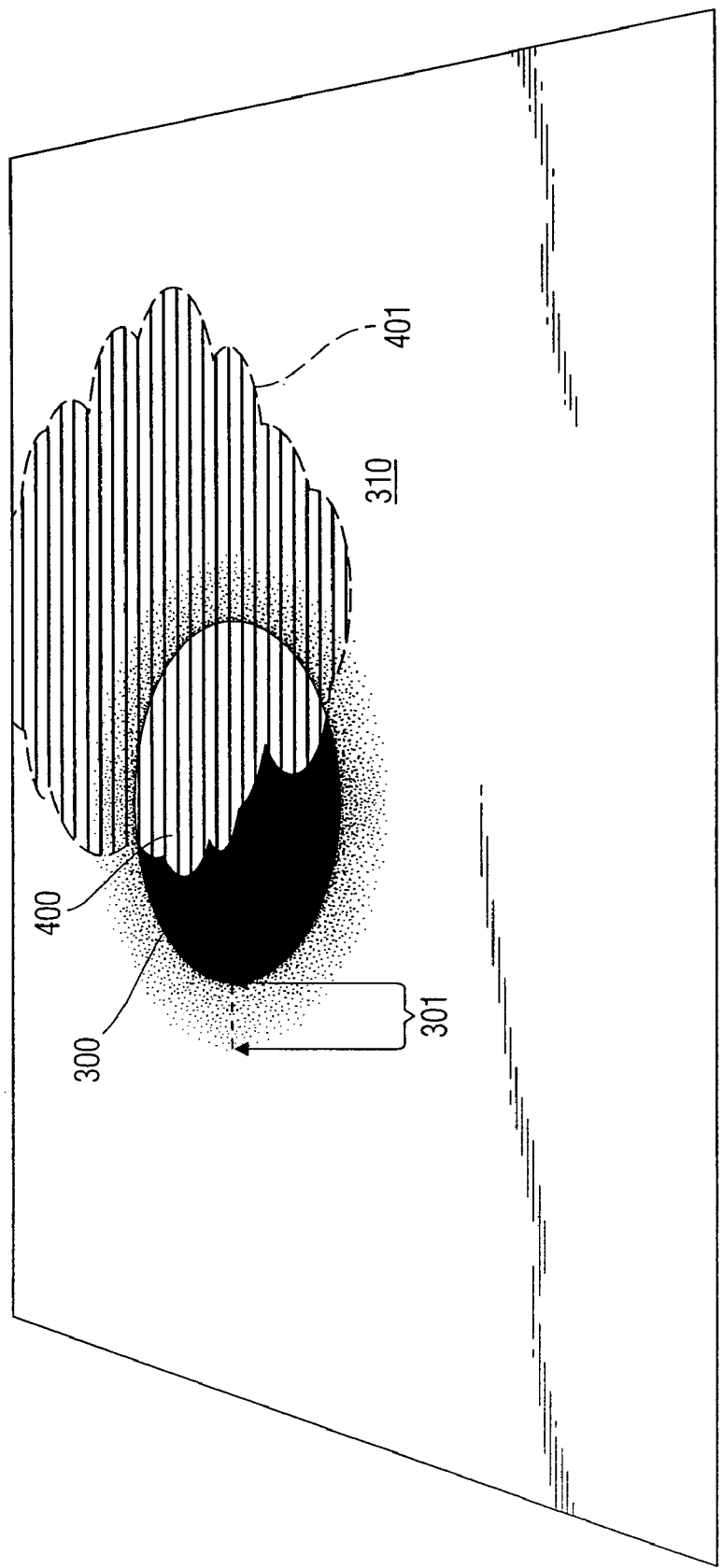
FIG. 4 is another diagram of a rendering of a scene in which no shadow illuminator is used.

FIG. 4 is another scene which may result from a prior art system or method that does not utilize a shadow illuminator. The scene of FIG. 4 is the result of an attempt to compensate for indirect art in shadows used in the prior art. More specifically, an additional ordinary light source has been used to compensate for the absence of indirect light in the shadow region 300. The light source creates a lit region 400. It should be noted that the lit region does not coincide with the shadowed region and overlaps the initially illuminated region in area 401.

FIG. 4 illustrates an often encountered problem with prior art methods for compensating for indirect light in shadows. More specifically, if one uses an ordinary light source to compensate for indirect light in shadows, it will be very difficult to align that ordinary light source perfectly with the shadowed regions. Consequently, the light source which was intended only for the shadowed regions may also illuminate non-shadowed regions and thus cause deterioration in other aspects of the scene. It is further noted that while the examples of FIGS. 3-8 use circular shadows for the sake of simplicity, in practice shadows of much more complicated shapes will usually occur in rendered scenes. Thus, it would be much more difficult to precisely align ordinary light sources with shadowed regions. Therefore, the prior art method of using ordinary light sources to compensate for indirect light in shadowed regions is not practical.

Figure 5:
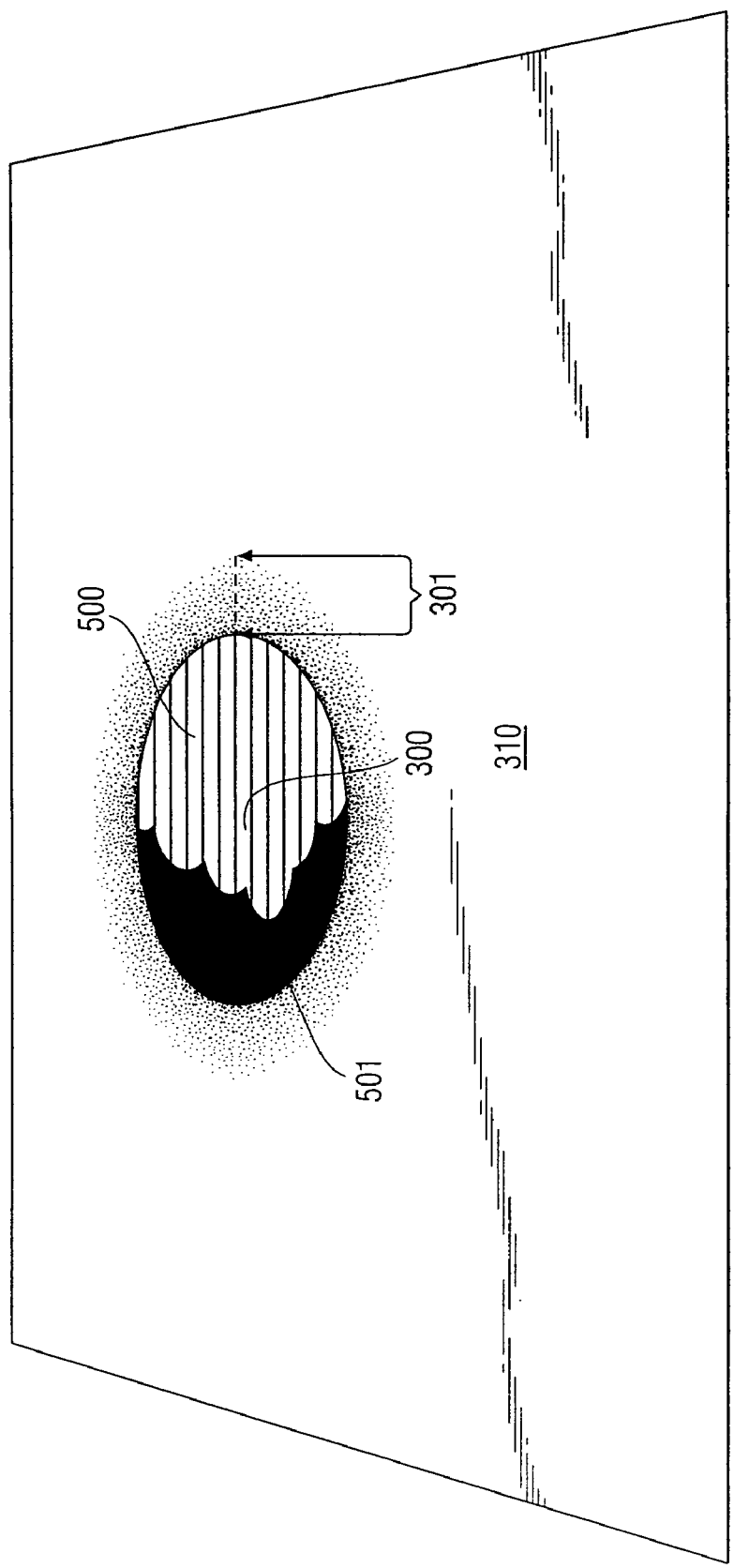
FIG. 5 is a diagram of a rendering of a scene in which a single shadow illuminator is used according to an embodiment of the invention.

FIG. 5 shows a scene rendered by an embodiment of the present invention which utilizes a shadow illuminator. It can be seen that a portion 500 of the shadowed area 300 is illuminated by light contributed by the shadow illuminator. However, the light from the shadow illuminator does not "spill over" outside of the actual shadow (as was the case with the scene of FIG. 4).

It should be also noted that in the anti-aliased region 301 there is a smooth transition between the illumination provided by the shadow illuminator and that provided by the primary light source. This may be accomplished, for example, by calculating an average (or a weighted average) of the illumination values of a pixel and the pixels around it in order to obtain a final illumination value for that pixel.

There is also an area 501 of the shadowed region 300 which is not illuminated by the shadow illuminator. This due to the configuration of the shadow illuminator. More specifically, the beam of the shadow illuminator is slightly displaced from the shadowed region 300, so that an area of that region remains without any illumination. Leaving a dark region, such as region 501, is purely a choice of the operator or artist setting up the scene and is not required for embodiments of the present invention.

Figure 6:
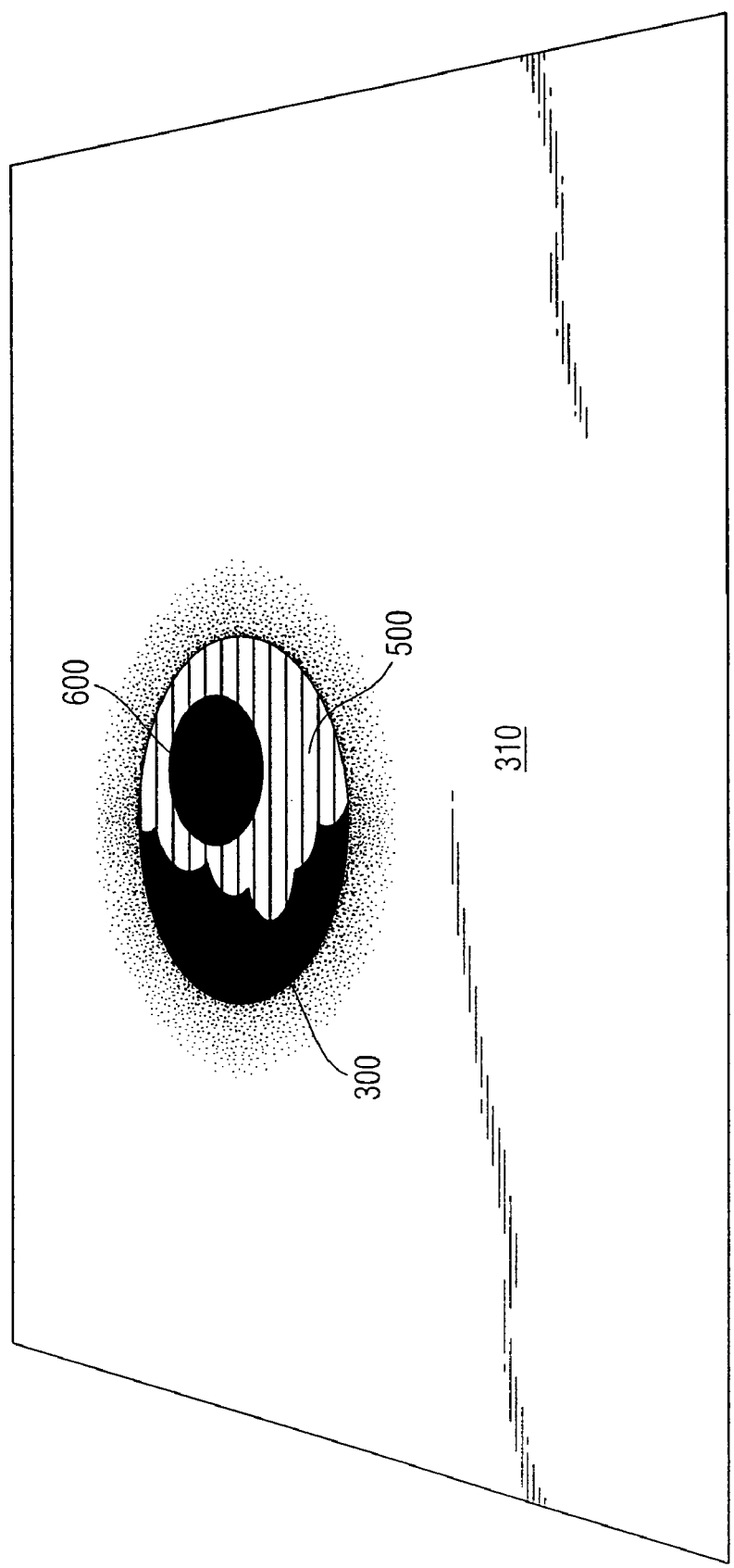
FIG. 6 is also a diagram of a rendering of a scene in which a single shadow illuminator is used according to an embodiment of the invention.

FIG. 6 is another scene rendered by an embodiment of the present invention. The scene of FIG. 6 illustrates the case where a shadow 600 associated with the shadow illuminator is also present. Shadow 300 is associated with a primary light source and therefore is illuminated by the shadow illuminator associated with the primary light source. However, shadow 600 is associated with the shadow illuminator and therefore is not illuminated at all. Shadow 600 may be caused by an object which is in the path of the light propagating from the shadow illuminator. For example, with reference to FIG. 1, shadow 600 may be caused by object 112.

Figure 7:
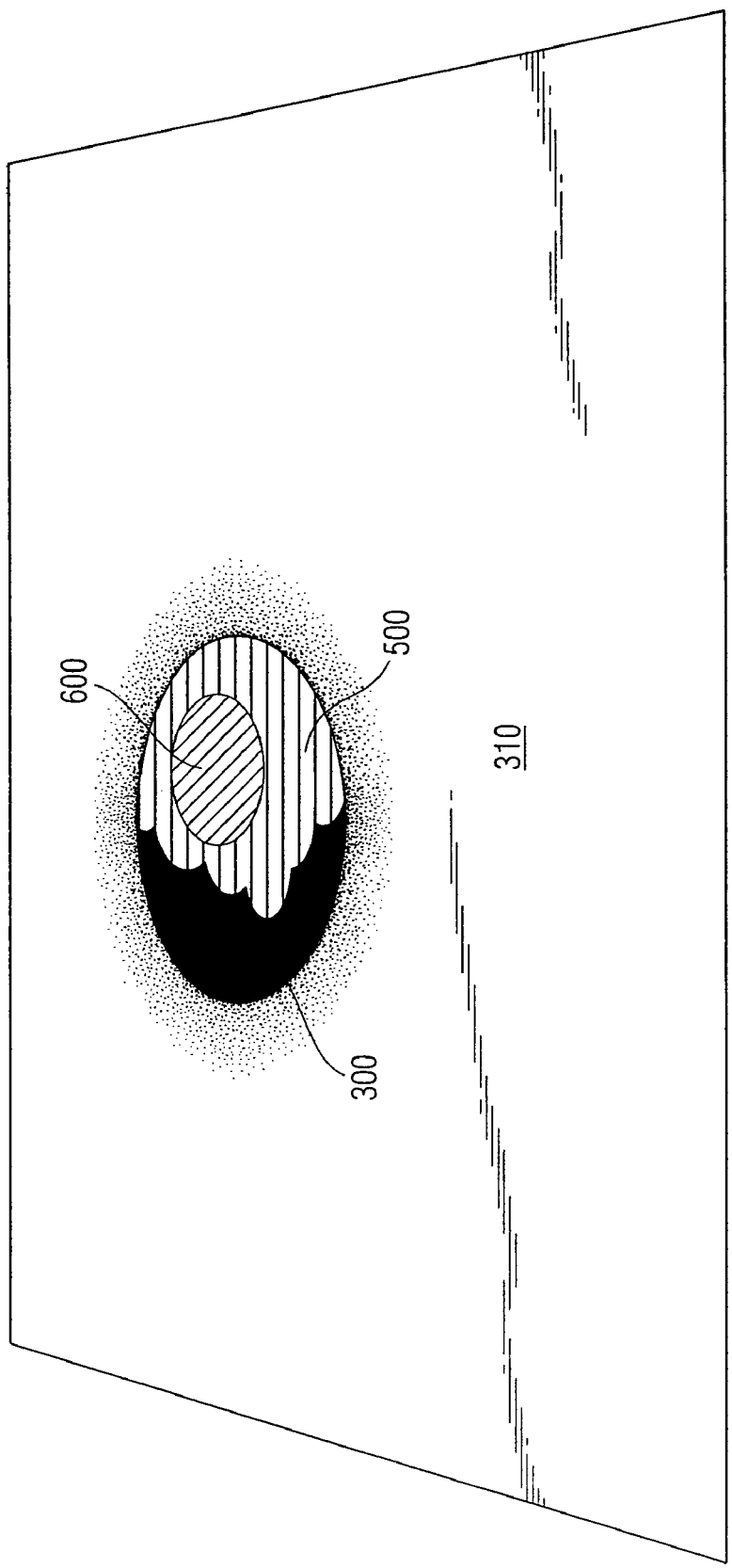
FIG. 7 is a diagram of a rendering of a scene in which two nested shadow illuminators are used according to an embodiment of the invention.

FIG. 7 shows another scene rendered according to an embodiment of the present invention. The scene of FIG. 7 illustrates the use of nested shadow illuminators. A first shadow illuminator is associated with the primary light source that causes shadow 300. The first shadow illuminator creates illumination in region 500 of the shadow 300. However, the first shadow illuminator itself creates a shadow 600 (as discussed above in connection with FIG. 6). In the scene of FIG. 7, a second shadow illuminator associated with the first shadow illuminator is used. Thus, the first shadow illuminator is the primary light source for the second shadow illuminator. The second shadow illuminator illuminates the regions that are in the shadows caused by the first shadow illuminator, i.e. region 600.

Figure 8:
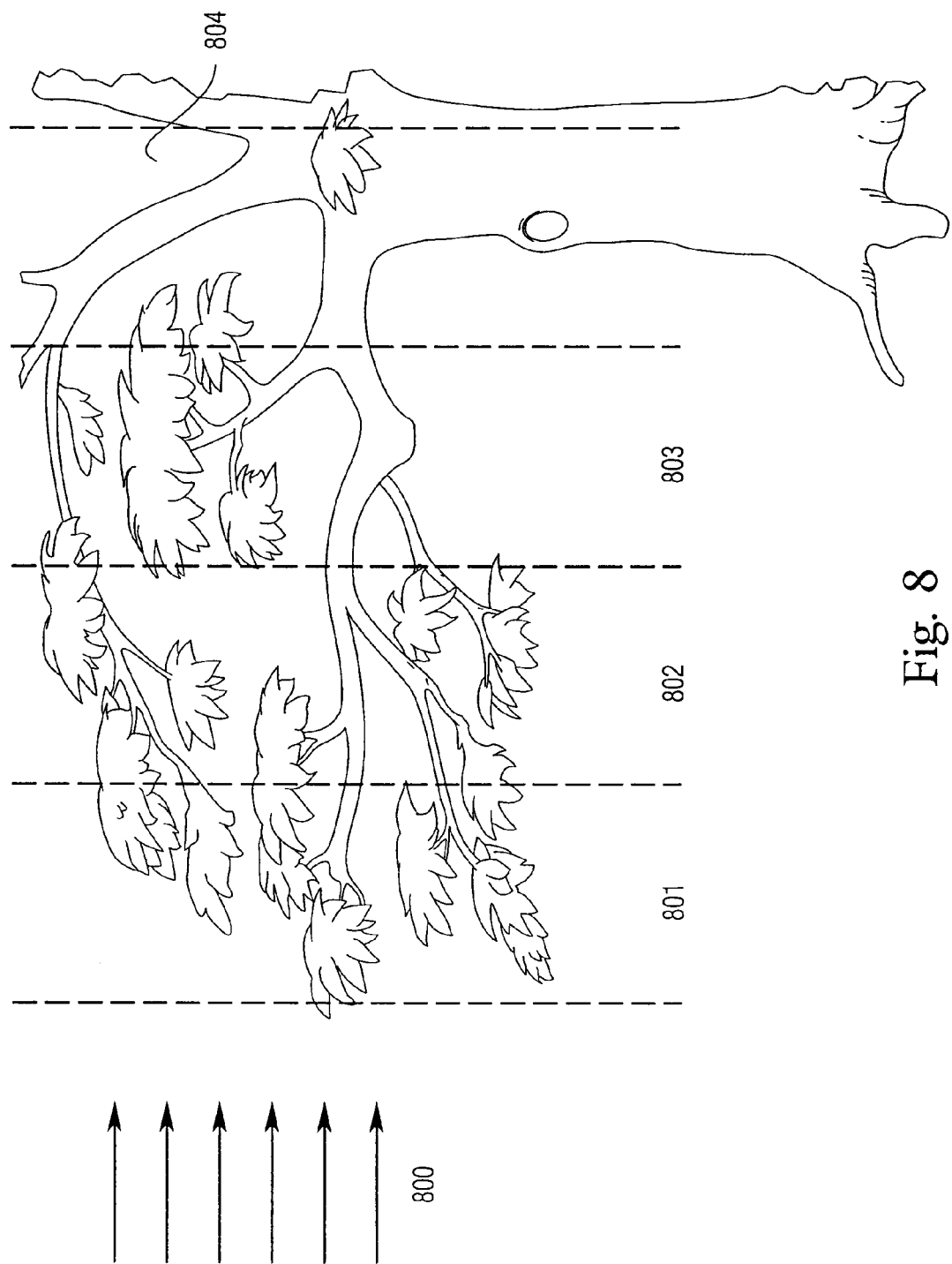
FIG. 8 is a diagram illustrating the use of multiple nested shadow illuminators according to an embodiment of the invention.

FIG. 8 shows an example of a scene for which multiple nested shadow illuminators may be useful. FIG. 8 illustrates a tree with dense foliage. The foliage may be lit by parallel light rays 800. The foliage may be separated into several layers 801-804 in relation to the light illuminating it. Most of layer 801 is directly illuminated by the light. However, layer 802 is mostly in the shadows of the foliage of layer 801. A prior art system may provide no illumination for layers 802-804. However, this would not be realistic, because in real life internal layers of foliage are usually illuminated by indirect light. An embodiment of the present invention may provide a first shadow illuminator to illuminate layer 802, thus simulating the indirect light. The first shadow illuminator may be associated with the direct light source 800. Thus, the first shadow illuminator will illuminate only those portions of layer 802 that are in the shadow of layer 801 in relation to light source 800. The other portions will be illuminated directly by the light source 800.

Similarly, a second shadow illuminator may be provided to illuminate layer 803. The second shadow illuminator may be associated with the first shadow illuminator. Thus, elements of layer 803 that are not actually in the shadows in relation to the first shadow illuminator and layer 801 will not be illuminated by the second shadow illuminator (they will instead be illuminated by the first one). The second shadow illuminator may be of lower intensity than the first one, because the inner layers of foliage usually receive less indirect light. Similarly a third shadow illuminator, associated with the second one may be used to illuminate the innermost layer 804. Thus, the tree of FIG. 8 may be rendered in a more realistic and complex manner, showing progressively darker but nevertheless illuminated inner layers of the foliage.

The embodiments discussed herein may be implemented as software running on a computer. Furthermore, these embodiments may be implemented as hardware only computing devices or a combination of software and hardware. In most embodiments, the computer device which implements the embodiments may include an interface which allows an artist or a user to set up scenes by creating or importing various objects, placing them in an environment, placing various direct or shadow illuminator light sources in the environment, etc. The computer device may also include an interface that provides a picture or a video of the rendered scene. The rendered video may be, for example, a movie.

In some cases, the scenes may be set up automatically by the computing device itself. For example, an embodiment of the present invention may be used to render a virtual environment or a video game. In such a case, the various scenes may be automatically set up by the computer device depending on events that are occurring in the virtual environment or video game. Therefore, in some embodiments most actions discussed herein as being performed by users, artists or operators, may be performed by suitable programmed computers instead.

Some embodiments of the present invention may be implemented on computing devices of high computing power. For example, some embodiments may be implemented on a supercomputer or a distributed computer. Other embodiments may be implemented on personal computers, video game machines, portable computers, etc.

Figure 9:
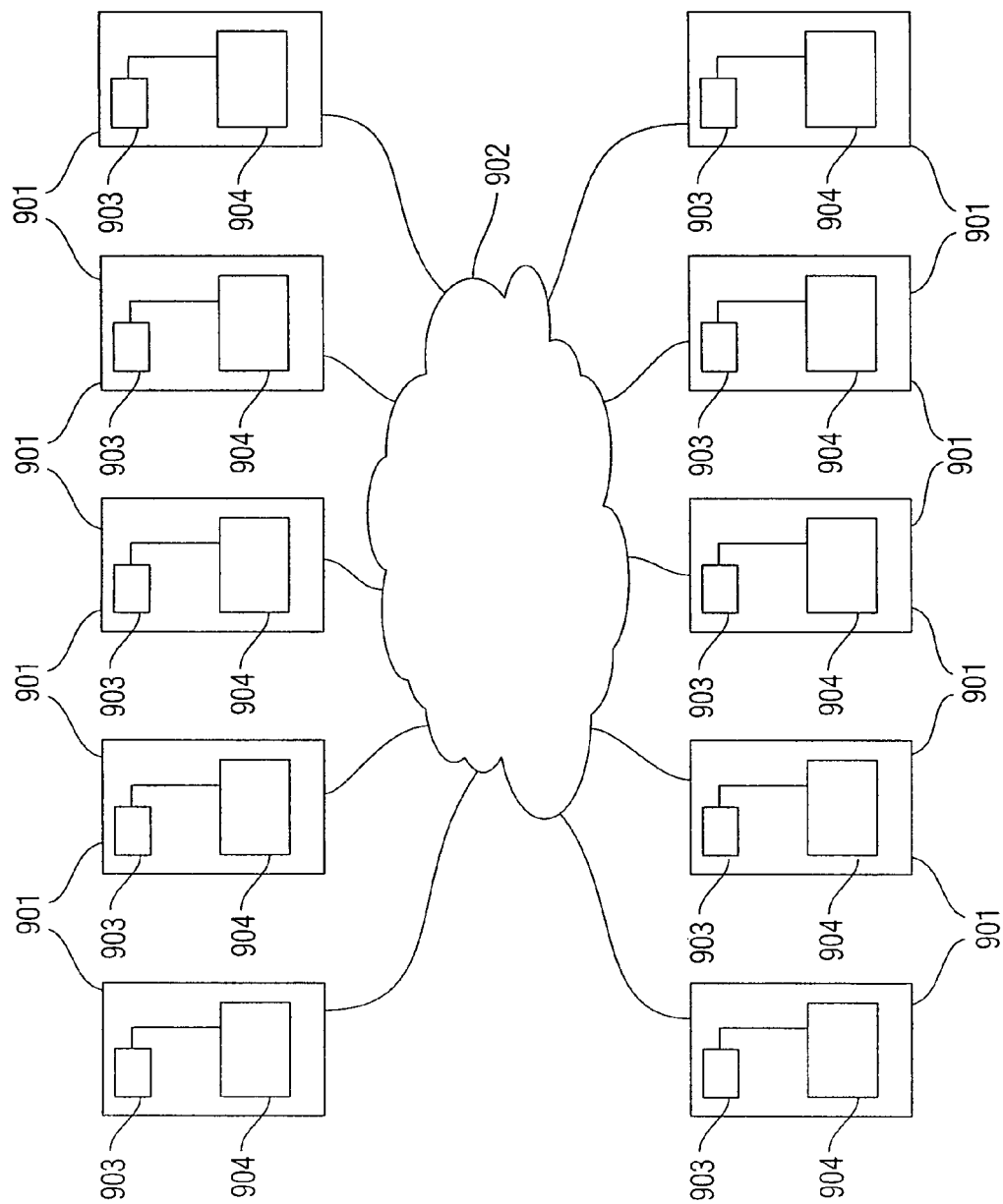
FIG. 9 is a diagram showing a distributed computing system which may perform rendering according to an embodiment of the present invention.

FIG. 9 shows an embodiment implemented on a distributed computer. In the distributed computing example of FIG. 9, a plurality of computers 901 execute a software application implementing the present invention in parallel. Each computer 901 includes a processor 903 and memory 904. The computers may render different portions of a scene or different scenes in parallel. The computers communicate through a network 902. The software application may exist in its entirety in the memory 904 of a single computer 901, or alternatively portions of it may be stored and executed at one or more computers. Managing components of the software application running on one or more of the computers may create and assign various tasks to other portions of the software application running on the same or other computers. The multiple computers may be positioned in proximity to each other or they may be located remotely and connected through a pervasive network, such as the Internet.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for determining a total illumination of a pixel within a rendered image, comprising:
    placing one or more primary light sources within a scene;
    placing a shadow illuminator within the scene, the shadow illuminator being associated with one of the one or more primary light sources;
    determining whether the pixel is in a shadow with respect to said primary light source; and
    modifying the total illumination of the pixel by taking into account illumination contributed from the shadow illuminator only if the pixel is determined to be in a shadow with respect to said primary light source.

2. The method of claim 1, wherein modifying the total illumination of the pixel comprises adding illumination associated with the shadow illuminator to an aggregate illumination for the pixel.

3. The method of claim 1, further comprising shading the pixel based on the total illumination value of the pixel.

4. The method of claim 1, wherein determining whether the pixel is in a shadow further comprises accessing a shadow map associated with said primary light source.

5. The method of claim 1, further comprising:
    repeating the steps of claim 1 multiple times in order to determine initial total illumination values for the pixel as well as a plurality of pixels in proximity to the pixel;

calculating a weighted average of the initial illumination value of the pixel and the plurality of pixels in proximity to the pixel; and basing the total illumination value of the pixel on the weighted average.

6. The method of claim 1, further comprising:

determining whether the pixel is in a shadow with respect to the shadow illuminator;

wherein, during the modifying the total illumination step, the total illumination is not modified to take into account illumination contributed from the shadow illuminator if the pixel is determined to be in a shadow with respect to the shadow illuminator.

7. The method of claim 6, wherein determining whether the pixel is in a shadow with respect to the shadow illuminator further comprises accessing a shadow map associated with the shadow illuminator.

8. The method of claim 1, wherein:

placing a shadow illuminator within a scene includes placing two or more shadow illuminators within the scene and associating the two or more shadow illuminators with the primary light source; and modifying the total illumination of the pixel includes taking into account illumination contributed from the two or more shadow illuminators only if the pixel is determined to be in a shadow with respect to said primary light source.

9. The method of claim 1, further comprising:

placing a second shadow illuminator within the scene, the second shadow illuminator being associated with the shadow illuminator;

determining whether the pixel is in a shadow with respect to the shadow illuminator; and modifying the total illumination of the pixel by taking into account illumination contributed from the second shadow illuminator only if the pixel is determined to be in a shadow with respect to the shadow illuminator.

10. A method for determining a total illumination of a pixel within a rendered image, comprising:

placing two or more primary light sources within a scene;

placing a shadow illuminator within the scene, the shadow illuminator being associated with two or more associated light sources of the two or more primary light sources;

determining whether the pixel is in a shadow with respect to at least one of the two or more associated light sources; and modifying the total illumination of the pixel by taking into account illumination contributed from the shadow illuminator only if the pixel is determined to be in a shadow with respect to at least one of the two or more associated light sources.

11. A method for determining a total illumination of a pixel within a rendered image, comprising:

placing two or more primary light sources within a scene;

placing a shadow illuminator within the scene, the shadow illuminator being associated with two or more associated light sources of the two or more primary light sources;

determining whether the pixel is in a shadow with respect to each of the two or more associated light sources; and modifying the total illumination of the pixel by taking into account illumination contributed from the shadow illuminator only if the pixel is determined to be in a shadow with respect to each of the two or more associated light sources.

12. A non-transitory computer readable medium comprising computer executable instructions configured to cause a processor to determine a total illumination of a pixel within a rendered image by performing a method comprising:

placing one or more primary light sources within a scene;

placing a shadow illuminator within the scene, the shadow illuminator being associated with one of the one or more primary light sources;

determining whether the pixel is in a shadow with respect to said primary light source; and modifying the total illumination of the pixel by taking into account illumination contributed from the shadow illuminator only if the pixel is determined to be in a shadow with respect to said primary light source.

13. The non-transitory computer readable medium of claim 12, wherein modifying of the total illumination of the pixel comprises adding illumination associated with the shadow illuminator to an aggregate illumination for the pixel.

14. The non-transitory computer readable medium of claim 12, wherein the method further comprises shading the pixel based on the total illumination value of the pixel.

15. The non-transitory computer readable medium of claim 12, wherein the determining whether the pixel is in a shadow further comprises accessing a shadow map associated with said primary light source.

16. The non-transitory computer readable medium of claim 12, wherein the method further comprises:

repeating the steps of claim 12 multiple times in order to determine initial total illumination values for the pixel as well as a plurality of pixels in proximity to the pixel;

calculating a weighted average of the initial illumination value of the pixel and the plurality of pixels in proximity to the pixel; and basing the total illumination value of the pixel on the weighted average.

17. The non-transitory computer readable medium of claim 12, wherein the method further comprises:

determining whether the pixel is in a shadow with respect to the shadow illuminator, wherein, during the modifying the total illumination step, the total illumination is not modified to take into account illumination contributed from the shadow illuminator if the pixel is determined to be in a shadow with respect to the shadow illuminator.

18. The non-transitory computer readable medium of claim 17, wherein determining whether the pixel is in a shadow with respect to the shadow illuminator further comprises accessing a shadow map associated with the shadow illuminator.

19. The non-transitory computer readable medium of claim 12, wherein:

placing a shadow illuminator within a scene includes placing two or more shadow illuminators within the scene and associating the two or more shadow illuminators with the primary light source; and modifying the total illumination of the pixel includes taking into account illumination contributed from the two or more shadow illuminators only if the pixel is determined to be in a shadow with respect to said primary light source.

20. The non-transitory computer readable medium of claim 12, wherein the method further comprises:

placing a second shadow illuminator within the scene, the second shadow illuminator being associated with the shadow illuminator;

determining whether the pixel is in a shadow with respect to the shadow illuminator; and modifying the total illumination of the pixel by taking into account illumination contributed from the second shadow illuminator only if the pixel is determined to be in a shadow with respect to the shadow illuminator.

21. A non-transitory computer readable medium comprising computer executable instructions configured to cause a processor to determine a total illumination of a pixel within a rendered image by performing a method comprising:
placing two or more primary light sources within a scene;
placing a shadow illuminator within the scene, the shadow illuminator being associated with two or more associated light sources of the two or more primary light sources;
determining whether the pixel is in a shadow with respect to at least one of the two or more associated light sources; and
modifying the total illumination of the pixel by taking into account illumination contributed from the shadow illuminator only if the pixel is determined to be in a shadow with respect to at least one of the two or more associated light sources.

22. A non-transitory computer readable medium comprising computer executable instructions configured to cause a processor to determine a total illumination of a pixel within a rendered image by performing a method comprising:
placing two or more primary light sources within a scene;
placing a shadow illuminator within the scene, the shadow illuminator being associated with two or more associated light sources of the two or more primary light sources;
determining whether the pixel is in a shadow with respect to each of the two or more associated light sources; and
modifying the total illumination of the pixel by taking into account illumination contributed from the shadow illuminator only if the pixel is determined to be in a shadow with respect to each of the two or more associated light sources.

23. An apparatus for determining a total illumination of a pixel within a rendered image, the apparatus comprising a processor and a memory, the memory comprising instructions configured to cause the processor to:
place one or more primary light sources within a scene;
place a shadow illuminator within the scene, the shadow illuminator being associated with one of the one or more primary light sources;
determine whether the pixel is in a shadow with respect to said primary light source; and
modify the total illumination of the pixel by taking into account illumination contributed from the shadow illuminator only if the pixel is determined to be in a shadow with respect to said primary light source.

24. The apparatus of claim 23, wherein modifying of the total illumination of the pixel comprises adding illumination associated with the shadow illuminator to an aggregate illumination for the pixel.

25. The apparatus of claim 23, wherein the instructions are further configured to cause the processor to shade the pixel based on the total illumination value of the pixel.

26. The apparatus of claim 23, wherein determining whether the pixel is in a shadow further comprises accessing a shadow map associated with said primary light source.

27. The apparatus of claim 23, wherein the instructions are further configured to cause the processor to:
repeat the actions of claim 23 multiple times in order to determine initial total illumination values for the pixel as well as a plurality of pixels in proximity to the pixel;
calculate a weighted average of the initial illumination value of the pixel and the plurality of pixels in proximity to the pixel; and
base the total illumination value of the pixel on the weighted average.

28. The apparatus of claim 23, wherein the instructions are further configured to cause the processor to:
determine whether the pixel is in a shadow with respect to the shadow illuminator;
wherein the total illumination is not modified to take into account illumination contributed from the shadow illuminator if the pixel is determined to be in a shadow with respect to the shadow illuminator.

29. The apparatus of claim 28, wherein determining whether the pixel is in a shadow with respect to the shadow illuminator further comprises accessing a shadow map associated with the shadow illuminator.

30. The apparatus of claim 23, wherein:
placing a shadow illuminator within a scene includes placing two or more shadow illuminators within the scene and associating the two or more shadow illuminators with the primary light source; and
modifying the total illumination of the pixel includes taking into account illumination contributed from the two or more shadow illuminators only if the pixel is determined to be in a shadow with respect to said primary light source.

31. The apparatus of claim 23, wherein the instructions are further configured to cause the processor to:
place a second shadow illuminator within the scene, the second shadow illuminator being associated with the shadow illuminator;
determine whether the pixel is in a shadow with respect to the shadow illuminator; and
modify the total illumination of the pixel by taking into account illumination contributed from the second shadow illuminator only if the pixel is determined to be in a shadow with respect to the shadow illuminator.

32. The apparatus of claim 23, wherein the apparatus comprises a generally programmable computer.

33. The apparatus of claim 32, wherein the apparatus comprises a supercomputer.

34. The apparatus of claim 32, wherein the apparatus comprises a cluster of generally programmable computers.

35. The apparatus of claim 23, wherein the apparatus is an application specific computing device.

36. An apparatus for determining a total illumination of a pixel within a rendered image, the apparatus comprising a processor and a memory, the memory comprising instructions configured to cause the processor to:
place two or more primary light sources within a scene;
place a shadow illuminator within the scene, the shadow illuminator being associated with two or more associated light sources of the two or more primary light sources;
determine whether the pixel is in a shadow with respect to at least one of the two or more associated light sources; and
modify the total illumination of the pixel by taking into account illumination contributed from the shadow illuminator only if the pixel is determined to be in a shadow with respect to at least one of the two or more associated light sources.

37. An apparatus for determining a total illumination of a pixel within a rendered image, the apparatus comprising a processor and a memory, the memory comprising instructions configured to cause the processor to:

place two or more primary light sources within a scene;
place a shadow illuminator within the scene, the shadow illuminator being associated with two or more associated light sources of the two or more primary light sources;
determine whether the pixel is in a shadow with respect to each of the two or more associated light sources; and
modify the total illumination of the pixel by taking into account illumination contributed from the shadow illuminator only if the pixel is determined to be in a shadow with respect to each of the two or more associated light sources.

* * * * *